US 007768419B2

(12) United States Patent
Messel et al.

(10) Patent No.: US 7,768,419 B2
(45) Date of Patent: Aug. 3, 2010

(54) MOBILE COMMUNICATION TERMINAL (75) Inventors: Atle Messel, Copenhagen (DK); Giovanni Ferranti, Broenshoej (DK); Timo Elomaa, Tampere (FI); Tapani Jokinen, Helsinki (FI); Michael McKay, Calabasas, CA (US)

(73) Assignee: Nokia Corporation, Espoo (FI)

( * ) Notice: Subject to any disclaimer, the term of this patent is extended or adjusted under 35 U.S.C. 154(b) by 201 days.

(21) Appl. No.: 11/951,215

(22) Filed: Dec. 5, 2007

(65) Prior Publication Data
US 2008/0129531 A1 Jun. 5, 2008

Related U.S. Application Data (63) Continuation of application No. 10/096,491, filed on Mar. 13, 2002, now Pat. No. 7,373,120.

(51) Int. Cl.
*G08B 5/00* (2006.01)

(52) U.S. Cl. ............ 340/815.4; 340/539.1; 340/539.11; 340/693.5; 340/321; 340/330; 340/331; 340/332

(58) Field of Classification Search ............. 340/815.4, 340/539.1, 539.11, 693.5, 321, 330, 331, 340/332
See application file for complete search history.

(56) References Cited

U.S. PATENT DOCUMENTS

| 7,557,704 | B2 * | 7/2009 | DeBaugh | 340/539.16 |
| 7,586,407 | B2 * | 9/2009 | Huang et al. | 340/540 |
| 7,592,925 | B2 * | 9/2009 | Nearhoof et al. | 340/815.4 |

* cited by examiner

Primary Examiner—Daryl Pope
(74) Attorney, Agent, or Firm—Foley & Lardner LLP (57) ABSTRACT A mobile communication terminal which includes a plurality of lights, apparatus for controlling the activation of the lights, apparatus for storing a number of sequences of activation of the lights, and apparatus for assigning one of the stored sequences of the activation of the lights to a particular event in the mobile communication terminal.

8 Claims, 9 Drawing Sheets

MOBILE COMMUNICATION TERMINAL

The present invention relates to mobile communication terminals that comprise a plurality of lights. In particular, the present invention relates to mobile communication terminals in which a sequence for the activation of the lights may be stored. The present invention relates further to a method of composing a sequence of activation of lights on a mobile communication terminal. The present invention relates in particular to a method of composing a sequence of activation of lights on a mobile communication terminal in which said mobile communication terminal comprises a display, a keypad, lights and a memory.

BACKGROUND ART

Mobile communication terminals depend in their functionality highly on the effectiveness of the user interface. One aspect of the user interface is the ability to notify the user. Such notification has in the past mainly been based on audio signals. In recent years the ability to notify the user of incoming calls the user with a vibrator has become popular.

GB 2 361 798 discloses a mobile communication terminal in which combinations of display colors or lighting notify an incoming call. The data for changes in lighting is stored in a RAM. A light driver independently drives the plurality of LEDs according to the data stored in the RAM when a call is received.

DISCLOSURE OF THE INVENTION

On this background, it is an object of the present invention to provide a mobile phone of the kind referred to initially, which allows a broader use of user notification through activation of lights. This object is achieved in accordance with claim 1 by providing a memory that can store a plurality of sequences for the activation of lights, and means for selectively assigning a stored sequence to a particular event in the mobile communication terminal. Thus, different events, such as incoming calls, incoming calls from a particular caller or caller group, key lock, key unlock, power on/off, calendar alarm, incoming SMS, high score, wake-up alarm, battery status indication and signal strength indication can be assigned a particular lighting sequence.

According to an embodiment, the means for selectively assigning one of the stored sequences of the activation of the lights to a particular event in the mobile communication terminal comprises a keypad, a display, and means for displaying on the display an indication which keys of the keypad need to be pressed to assign one of the stored sequences of the activation of the lights to a particular event in the mobile communication terminal.

Advantageously, the means for selectively controlling the activation of the lights comprises means for controlling the color of the lights and/or for controlling the intensity level at which the lights are activated. Thus the number of variations in light sequences and the attractiveness of the appearance is improved.

The user interface may further comprise means for composing the sequences of activation of the lights. Thus, the user can create his/her personal sequences. Preferably, the means for composing sequences of activation of the lights allows the user to select the intensity level of a light to be activated, preferably as low, middle, high, and/or allows the user to select the duration of the activation of a light to be activated, and/or allows selection of the timing between activations of the lights.

According to an embodiment, the means for composing sequences of activation of the lights comprises a keypad, a display, and means for displaying on the display an indication which keys of the keypad need to be pressed to compose a sequence of activation of the lights.

Advantageously, the sequence of activation of the lights is synchronized with a vibrator of the mobile communication terminal, so that a combined silent signaling is possible.

The mobile communication terminal lights may be LEDs and/or electro luminescent foils and/or electro luminescent strings and/or optical fibers.

It is another object of the present invention to provide a mobile communication terminal of the kind referred to initially, which allows a broader use of the lights. This object is achieved in accordance with claim 11 by providing the mobile communication terminal with means for transforming an audio signal into a control signal for activation of the lights.

Advantageously, the audio signal is provided by a microphone in the mobile communication terminal, and/or by a digital audio player in the mobile communication terminal and/or by a radio in the mobile communication terminal and/or by a memory in the mobile communication terminal in which ringing tunes are stored. With the microphone activated, e.g. in a discotheque or other place where music is played, the mobile communication terminal can be used as a light organ.

Advantageously, the audio signal is divided into two or more discrete frequency bands by filters, and the output of the filters is used to activate the lights, preferably with a light with a different color being assigned to each frequency band, and/or the intensity of the lights being modulated according to the output level from the filter driving the light. Thus, the light effects in response to the audio signal become more sophisticated.

The mobile communication terminal may also comprise means for recording and storing the activation of the lights in response to the audio signal. Thus, the user does not have to download or enter the sequences of activation of the lights, but may simply record, store and assign them to different events. Preferably, the intensity level during the activation of a light is also recorded.

It is another object of the present invention to provide a method of composing a sequence of activation of lights on a mobile communication terminal of the kind referred to initially. This object is achieved in accordance with claim 18 by providing a method comprising the steps of:

displaying on the display a menu in which the activity of composing of a sequence of activation of lights can be selected by pressing one or more keys of the keypad, and when such keys have been pressed, displaying on the display a menu in which the sequence of the activations of lights can be composed by pressing one or more keys of the keypad, and storing the composed sequence of the activation of lights.

According to a preferred embodiment, the method further comprises the step of displaying on the display a menu in which the color and/or intensity in which the lights are to be activated can be selected by pressing one or more keys of the keypad.

The method may further comprise the step of displaying on the display a menu in which the duration of an activation one of the lights can be selected pressing one or more keys of the keypad. Advantageously, the method may further comprise the step of displaying on the display a menu in which a sequence of activation of lights can be saved to the memory by pressing one or more keys of the keypad.

According to another preferred embodiment, the method further comprises the step of displaying on the display a menu in which a stored sequence of activation of lights can be retrieved form the memory by pressing one or more keys of the keypad. Advantageously, the method may further comprise the step of displaying on the display a menu in which the assignment of one of the stored sequences of activation of lights to a particular event in the mobile communication terminal can be selected by pressing one or more keys of the keypad. Advantageously, the method may further comprise the step of displaying on the display a menu in which a stored sequence of activation of lights can be send to another mobile communication terminal by pressing one or more keys of the keypad.

It is another object of the present invention to provide a method of assigning a sequence of activation of lights on a mobile communication terminal to a particular event in the communication terminal. This object is achieved in accordance with claim 25 by providing a method of assigning a sequence of activation of lights on a mobile communication terminal to a particular event in the communication terminal, wherein the mobile communication terminal comprises, a display, a keypad, lights and a memory in which at least one sequence of activation of lights is stored, comprising the steps of:

displaying on the display a menu in which the activity of assigning a sequence of activation of lights to a particular event in the mobile communication terminal can be selected by pressing one or more keys of the keypad, and when such keys have been pressed, displaying on the display a menu in which the assignment of one of the stored sequences of activation of lights to a particular event in the mobile communication terminal can be selected by pressing one or more keys of the keypad, and when such keys have been pressed, assigning the one stored sequence of activation of lights to the particular event.

It is another object of the present invention to provide a cover for removable attachment to a mobile phone, which allows broader use of user notification through activation of lights. This object is achieved in accordance with claim 26 by providing a removable cover comprising a plurality of lights, a connector for establishing an electrical connection to a counterpart on the mobile phone, and electric wiring connecting the connector with the plurality of lights.

Preferably, the plurality of lights comprises one or more electro luminescent elements. The electro luminescent elements may be foils and/or wires.

The electro luminescent foils may be divided in a plurality of segments that can be individually activated.

The electro luminescent foils may be provided with a two-dimensional wire net, whereby preferably parts of said two-dimensional wire net can be activated individually.

Two or more electro luminescent foils may be placed one above another, with the upper electro luminescent foil or foils preferably being more transparent to light than the lower electro luminescent foil or foils, whereby preferably each electro luminescent foil emits light of different color.

The connector preferably comprises at least connecting members for voltage, ground and control.

Further objects, features, advantages and properties of the mobile communication terminal according to the invention will become apparent from the detailed description.

BRIEF DESCRIPTION OF THE DRAWINGS

In the following detailed portion of the present description, the invention will be explained in more detail with reference to the exemplary embodiments shown in the drawings, in which.

DETAILED DESCRIPTION

In the following detailed description, a mobile communication terminal according to the invention in the form of a hand portable phone, preferably a cellular/mobile phone will be described by the preferred embodiments.

Figure 1A:
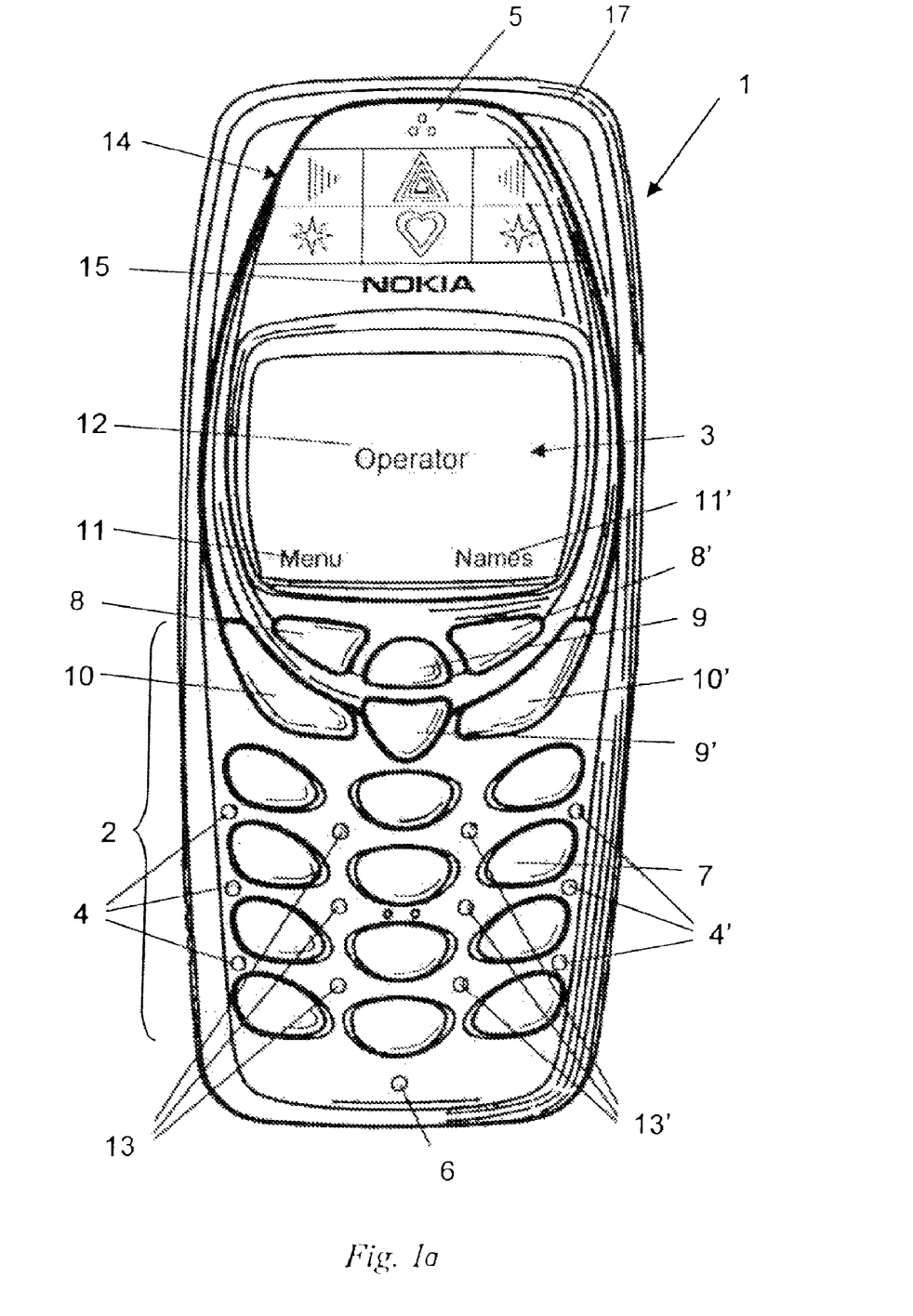
FIG. 1a is a diagrammatic view on a mobile communication terminal according to the invention.

FIG. 1a shows a preferred embodiment of a mobile phone according to the invention, and it will be seen that the mobile phone, which is generally designated by 1, comprises a user interface having a keypad 2, a display 3, an earpiece 5, and a microphone 6. The keypad 2 has a set of keys 7 for entering data. These keys 7 are in the form of alphanumeric keys, by means of which the user can enter numbers and letters, e.g. a phone number, a text message (SMS) or a name (associated with the phone number). The user uses the first group of keys primarily for entering data in the phone (entry events).

In the preferred embodiment, the keypad 2 additionally comprises two multi-functionality keys 8,8', so-called soft keys, whose function depends on the present state of the mobile phone 1. The default function or the present function of the multi-functionality keys 8,8' is displayed in separate fields 11,11' below a basic screen area 12 of the display 3. Information entered by said data entering keys and information received from the network are displayed in the basic screen area 12. In the preferred embodiment, the keypad additionally comprises a scrolling device which, in the preferred embodiment, is provided as scroll keys 9,9' for moving a cursor or a cursing bar in two opposite directions. By means of the scroll keys 9,9', the user can jump selectively from one item to the preceding or the succeeding item in the menu loop of the mobile phone 1, while he gets access to a submenu loop under the item concerned in the main menu loop by activation of the multi-functionality keys 8,8'. The call answer key 10 may be used for initiating a call, and the call end key 10' may be used to end a call. The use of multi-functionality keys 8,8' and the scroll keys 9,9' may advantageously be redefined in some states display. The user interface allows thus selection of a variety of available functions e.g. phone book, call register, settings, messages, etc. This user interface is as such known from U.S. Pat. No. 6,195,569, hereby incorporated by reference.

The mobile phone 1 is provided with a number of lights for indicating events in the mobile phone 1. The keypad 2 and the display 3 are each provided with a backlight using an as such conventional combination of LEDs and electro luminescent foil (not shown). The keypad 7 is provided with a green electro luminescent foil, whereas the display 3 is provided with a white electro luminescent foil. Further, the mobile phone 1 is equipped with a number of bi-color LEDs 4,4',13, 13' that are directly visible from the outside. The left side group 4 comprises 3 LEDs that light either in red or in blue. The right side group 4' comprises 3 LEDs that light either in red or in green. A central group of LEDs 13,13' lights either in orange or in blue. Above the display 3, two LEDs (not shown) are provided behind a transparent window 15. The window 15 is shaped as letters that form the word Nokia. The LEDs behind the window 15 either light in red or in yellow. An electro luminescent foil 14 is provided above the display 3. The electro luminescent foil 14 is divided in nine segments that can individually be activated. Within each segment, a two-dimensional wire net allows shapes or patterns to be displayed. In the present preferred embodiment the electro luminescent foil 14 comprises a segment with a plurality of concentrically arranged triangularly shaped wire nets. The triangularly shaped wire nets can be activated one after another to obtain an animation affect. The other eight segments of the electro luminescent foil 14 comprise different patterns that allow other animation effects such as a beating heart, rotating stars etc. The animation effects can be obtained by controlling the sequence of activation and the intensity and duration of the activation. In a preferred embodiment two electro luminescent foils are placed one over another, with the upper foil being more transparent to light. The colors of the light emitted by the two foils preferably being different, e.g. the upper foil emitting a yellow light and the lower foil emitting red light. When both foils are activated, the combined light will appear as orange to an observer. By varying the intensity of the light emitted by each of the foils the color perceived by an observer may be gradually varied from yellow via orange to red.

Figure 1B:
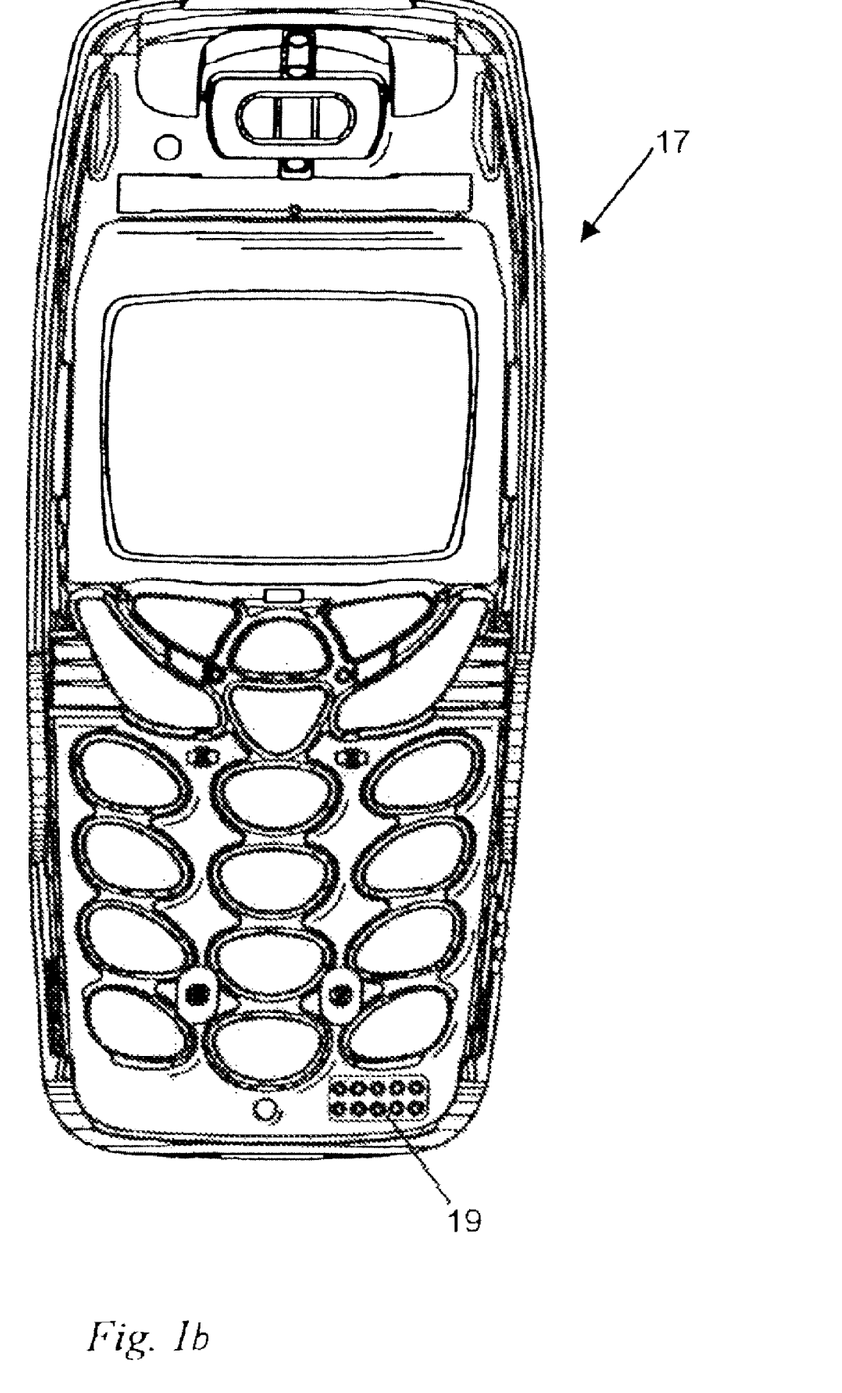
FIG. 1b is a view form on the back of a front cover with integrated lights.

According to a preferred embodiment, the lights are arranged on an exchangeable/removable front or back cover of the mobile phone. These type of covers are as such well known from e.g. the Nokia® 3310 mobile phone. FIG. 1*b* is a view form the rear on a front cover 17. The cover is provided with connector 19 which comprises a plurality of electrical contacts such as voltage, ground and control for the lights on the cover. Electric wiring is molded into the front cover 17 for connecting the lights 4,4',13,13',14 and 15 with the connector 19. The connector 19 has a not shown counter part on the core housing of the mobile phone.

Figure 1C:
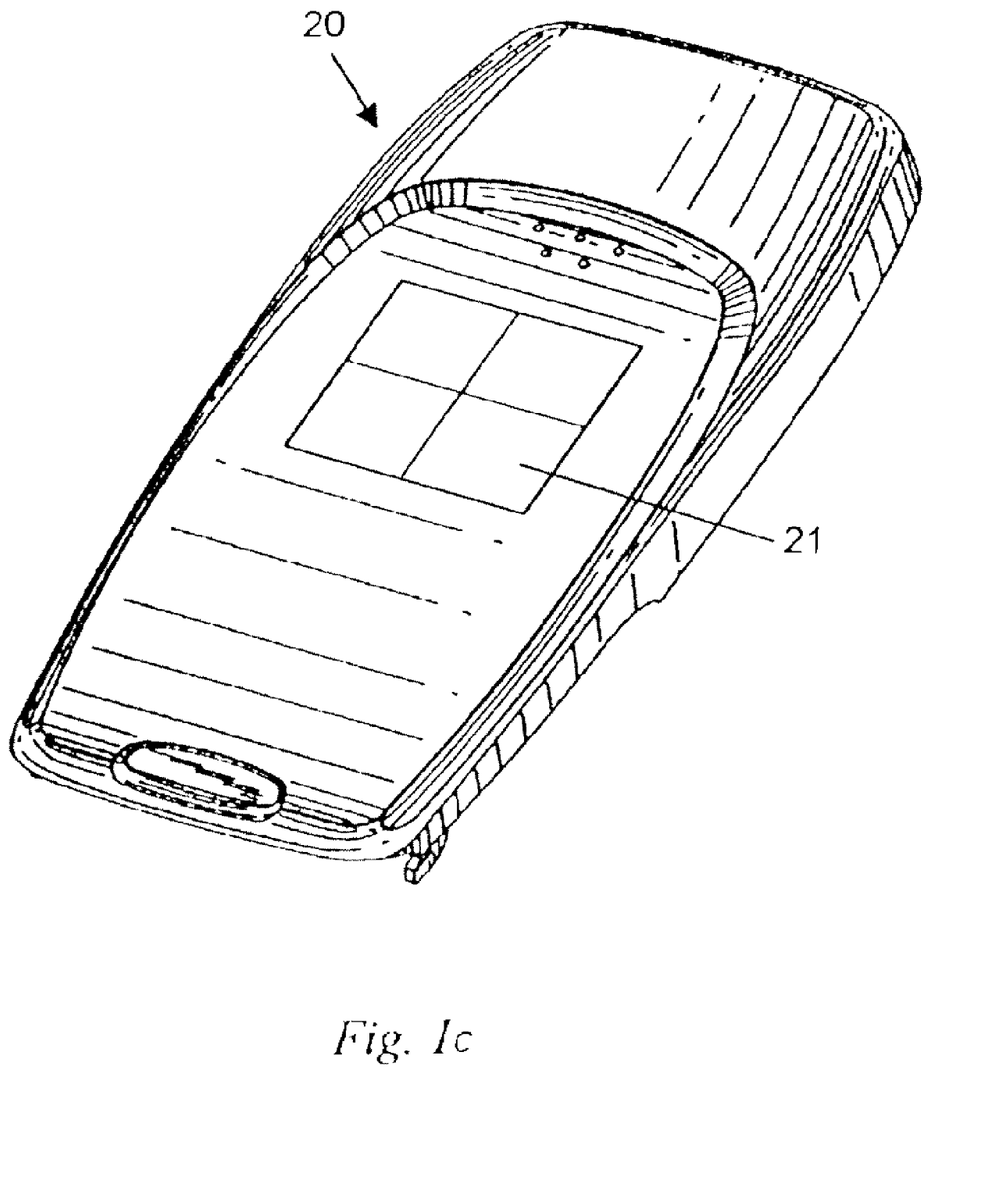
FIG. 1c is a perspective view on a back cover with integrated lights.

FIG. 1*c* illustrates a back cover 20 provided with an electro luminescent foil 21. The electro luminescent foil 21 is preferably molded into the rear cover 20. An electrical connector (not shown) for ground, voltage and control is provided on the side of the rear cover facing the core housing of the mobile phone. The electro luminescent foil 21 is divided into four segments that can individually be activated and for each of the segments two dimensional wire nets may be provided in a manner as shown for electro luminescent foil 14.

According to a preferred embodiment (not shown) the electro luminescent foil covers substantially the complete front cover with the exception of the display area and the openings for the keys. In case of a completely transparent electro luminescent foil, also the display area could be covered by the electro luminescent foil. The electro luminescent foil may be attached to the cover by different techniques such as integral mounding, applying adhesive, heat bonding etc. The tracks for the electric wiring can advantageously be shaped so as to form a desired design pattern that improves the appearance of the phone. In another preferred embodiment (not shown) the electro luminescent foil covers substantially the complete back cover. Also in this embodiment the tracks for the electric wiring may be arranged to form a desired design pattern that improves the appearance of the phone.

The mobile phone 1 is provided with an in build vibrator (not shown).

Figure 1D:
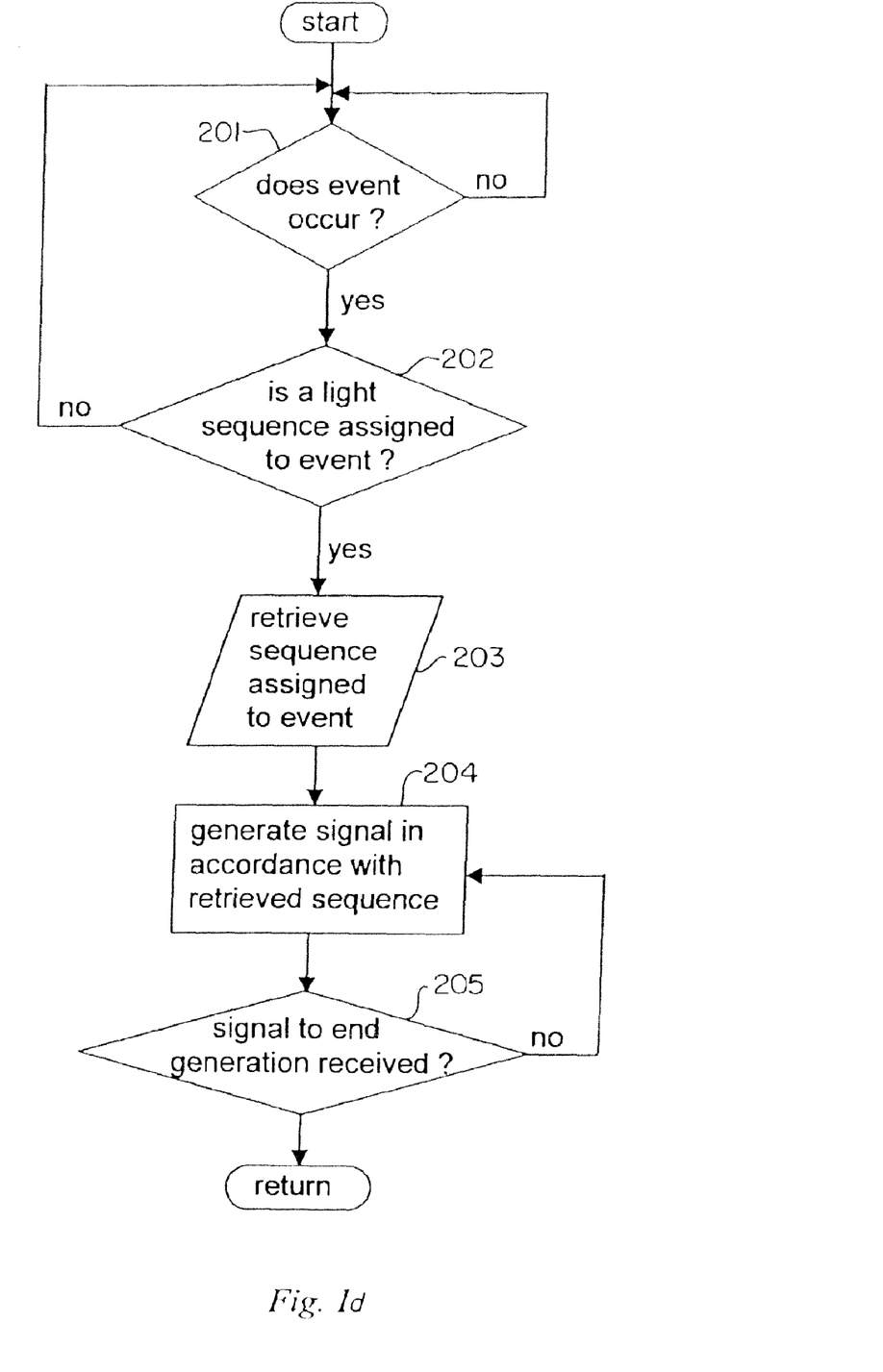
FIG. 1d is a flow chart illustrating the operation of the mobile communication terminal.

The mobile phone 1 comprises as such conventional hardware (not shown) including a microprocessor and related hardware such as RAM, ROM and ports for controlling and exchanging data in the mobile phone 1. A memory in the mobile phone 1 contains the data for sequences of activation of the lights. The term "sequence" used hereafter refers to a sequence of activation the lights. Each stored sequence comprises the data for timing, intensity and color of alight or a group of lights. The lights are activated by an L-driver (not shown). The L-driver can also activate the vibrator. The L-driver receives stored sequences from the memory and controls activation, color and intensity of the lights. As illustrated in FIG. 1*d*, when an event occurs (Step 201), a check is made if a sequence of activating the lights is assigned to the particular event (Step 202). An event is e.g. an incoming call, an incoming call from a particular caller or caller group, a key lock, a key unlock, a power on/off, a calendar alarm, an incoming SMS, a high score, a wake-up alarm, a battery status indication or a signal strength indication. If a sequence is assigned to the detected event, the sequence will be retrieved from the memory (Step 203) and the L-driver will generate a signal powering the lights accordingly (Step 204). The microprocessor also controls the activation of the vibrator through the L-driver. The activation of the vibrator may be assigned to an event and is synchronized with any light sequences assigned to the event. Stored sequences assigned to events that will only require the sequences to be played once, such as an incoming SMS will contain an end signal, thus, ending playing when the sequence has been played once (Step 205). Sequences assigned to events in which the sequence should be repeated until another event occurs, such as an incoming call, where repeated playing of the sequence must not stop before either the call answer key 10 is pressed or the call is ended, will be played until a signal to end playing the sequence is received, e.g. when the 10 answer key is pressed in response to an incoming call.

A method for composing a sequence through the user interface of the mobile phone 1 will be described below with reference to FIGS. 2 to 5. In FIGS. 2 to 5 the actual text displayed on the display 3 is depicted. In the user interface, a sequence of activation of the lights is referred to as a "light tune". Therefore the term "light tune" in FIGS. 2 to 5 corresponds to the term "sequence for the activation of the lights" in this text. To enter the user interface menu, the multi-functionality key 8 "Menu" is pressed (state 2.1). The "Light tunes" sub menu is selected by using the scroll buttons 9,9' to browse through the submenus and pressing the multi-functionality key 8 "Select" again (state 2.2). The display 3 lists the possibility to personalize or to activate sequences (state 2.3). By using the scroll keys 9,9' and selecting "Personalize" by pressing the multi-functionality key 8 "Options", the next state is displayed (state 2.4). In this state, the display 3 lists the events to which the sequence will be assigned. Using the scroll keys 9,9' and the multi-functionality key 8, the event is selected. The user interface requests to choose between composing or retrieving a sequence. If "Retrieve" is selected the next state of the display is shown in FIG. 4 (state 4.1), which will be described further below.

Figure 3:
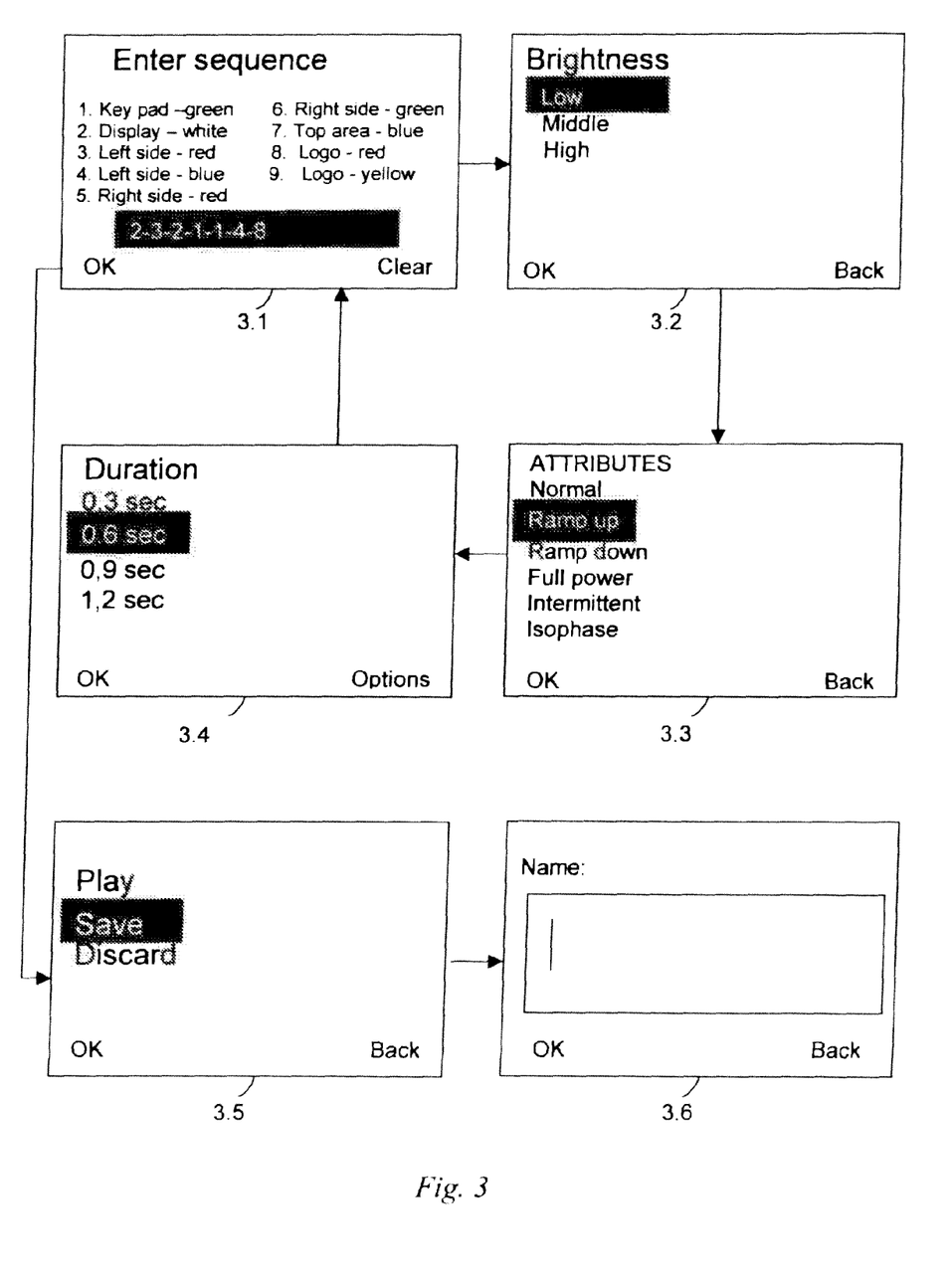
Figure 4:
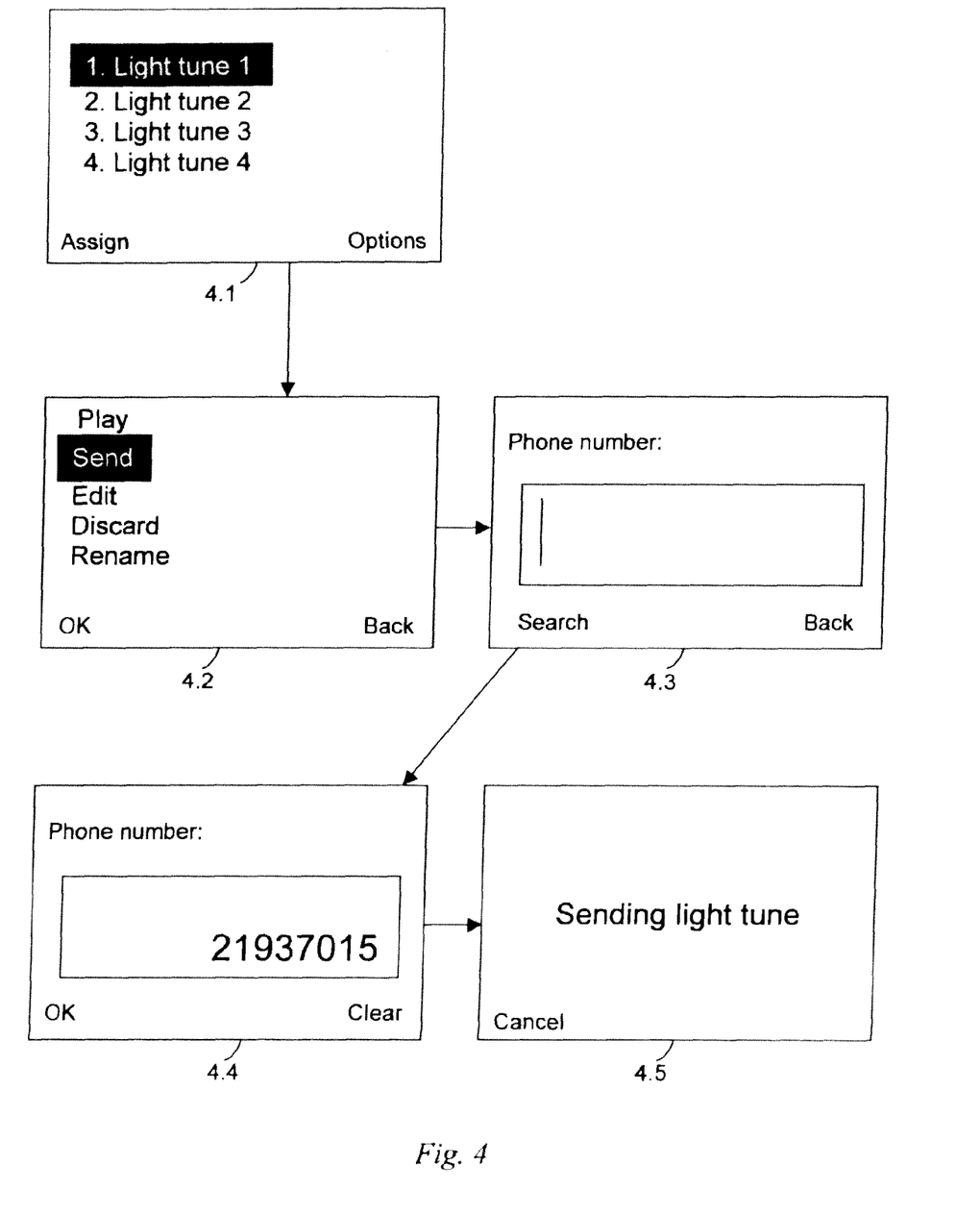
Figure 5:
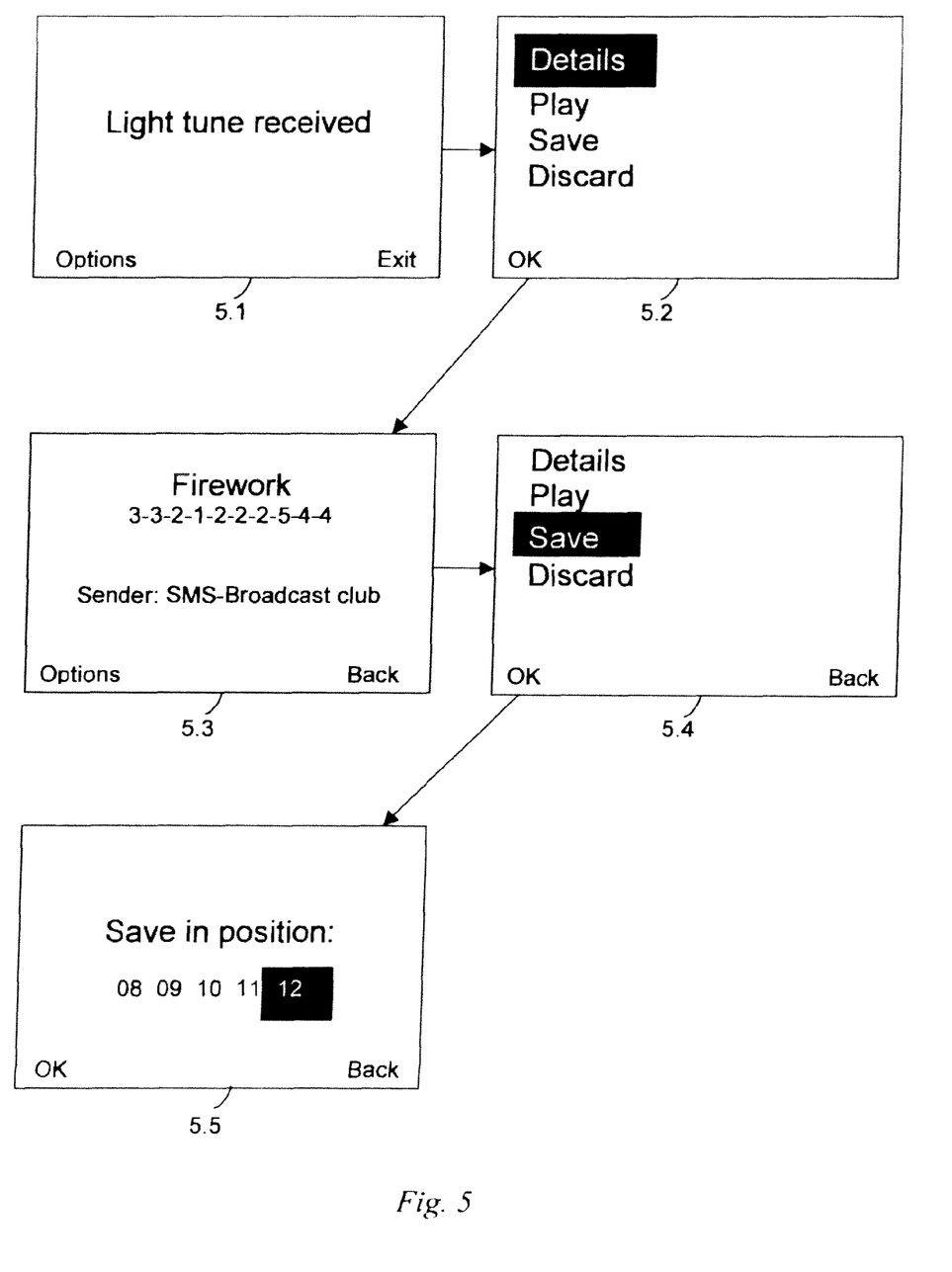

If "Compose" is selected, the next state of the display 3 is shown in FIG. 3 (state 3.1). In this state the display 3 shows a list indicating which of the lights, or group of lights, and if available, also the color in which they are to be activated is assigned to a particular alphanumerical key 7 of the keypad 2.

Thus, e.g. an activation of the left side LED group 4 in red is added to the sequence by pressing the corresponding alphanumerical key 7, in this case the alphanumerical key 7 on which the number 3 (not shown) is indicated. The sequence entered so far is displayed in the black horizontal bar at the lower part of the display 3. By pressing the respective alphanumerical key 7 a next light or group of lights is added to the sequence. The user interface will prompt in the next state to select the intensity (referred to by the user interface as "Brightness" (state 3.2). When the intensity has been selected using the scroll keys 9,9' and the multi-functionality key 8 "OK", the user interface will prompt to select further attributes for the type of activation, such as "Normal", "Ramp up", "Ramp down", "Full power", "Intermittent" or "Isophase". When the attributes have been selected, using the multi-functionality key 8 "OK", the user interface will prompt to select the length of the activation of the selected light or group of lights. By pressing multi-functionality key 8' "Options" a further submenu of the user interface (not shown) allows the activation length to be user-specified by entering a numerical value using the alphanumerical keys 7 on the keypad 2. When the length of the activation has been selected, the display returns to state 3.1. Erroneously entered numbers in the sequence can be deleted by pressing the multi-functionality key 8' "Clear". When the sequence is completed, pressing the multi-functionality key 8 "OK" changes the state of the display 3 to allow playing, saving or discarding the sequence (state 3.4). To save the sequence "Save" is selected from the submenu and pressing the multi-functionality key 8 "OK" results in the user interface prompting for entering a name for the sequence to be stored (state 3.5). After entering a name using the alphanumerical keys 7 of the keypad 2, the sequence will automatically be saved in one of the free memory positions. If there are no free memory positions the user interface will prompt for selecting a position to overwrite (state 3.6).

When in state 2.5 of the user interface (FIG. 2) "Retrieve from library" is selected, the next state of the user interface lists the stored sequences and prompts to select one by using the scroll keys 9,9' and pressing the multi-functionality key 8 "Assign" to assign the selected sequence to the previously selected event (state 4.1). By pressing the multi-functionality key 8' "Options", the user interface turns to state 4.2. allowing browsing with the scroll keys 9,9' through the options "Play", "Send", "Edit", "Discard" and "Rename". Selecting "Play" allows to play the sequence before assigning it to the preselected event. Selecting "Rename" allows the name assigned to the sequence to be changed. Selecting "Send" and pressing the multi-function key 8 "OK" the user interface will prompt for a phone number to send the channel setting to (state 4.3). After entering the number with the alphanumerical keys 7 the display area above the multi-function key 8 changes to "OK" (state 4.4). After pressing the multi-functionality key 8 "OK" the message will be sent (state 4.5). Alternatively, the phone number can be recalled from the phone book by pressing the multifunction key "Search" (state 4.3). The following phone number selection procedure from the in build phone book is not explained here, and is well known from e.g. the Nokia® 6210 mobile phone and the Nokia® 6210 User Manual which is hereby incorporated by reference. While the message is being sent, the user interface will display "Sending light tune" (state 4.6). The user still has a chance to interrupt the transmission by pressing the multi-function key 8 "Cancel". By selecting "Edit" in state 4.2 the user interface turns to state 3.1 so that the stored sequence may be edited before assigning it to the preselected event.

Text messages, such as SMS-messages, are a useful extension of the use of mobile phones. The technical specifications for the GSM Short Message Service are defined in: ETSI TS 100 901V7.4.0 (1999-12), Technical Specification, Digital cellular telecommunications system (Phase 2+); Technical realization of the Short Message Service (SMS); (GSM 03.40 version 7.4.0 Release 1998), hereby incorporated by reference. The messages may contain plain text, ringing tones, picture messages, WAP settings and business cards (Vcard). The type of message is coded in the user data header. The user data header is indicated in the first octet of the SMS-Submit TPDU (with message parameter value).

According to the present invention, a message sent to a mobile phone 1 contains a sequence of activation of lights, a "light tune". Upon receipt of a text message containing a sequence of activation of lights, the user interface will display a soft notification "Light tune received" FIG. 5, state 5.1. Upon pressing the multi functionality key 8 "Options", the user interface displays the options "Details", "Play", "Save" and "Discard" (state 5.2). By using the scroll keys 9,9' the user can select either of these four options. Selecting "Details" and pressing the multi function key 8 "OK" will result in the display listing the activation sequence (state 5.3). By pressing the multi-functionality key 8 "Options" the display 3 will show further details such as color, intensity etc. (not shown). By pressing the multi-functionality key 8' "Back" the display 3 turns to state 5.4. By selecting "Save" and pressing the multi-functionality key 8 "OK" the channel will automatically be saved in one of the free memory positions. If there are no free memory positions, the user interface will prompt for selecting a memory position to overwrite (state 5.5).

According to another preferred embodiment, the mobile phone is able to communicate via the so-called wireless application protocol (WAP). Like any other data set, sequences for the activation of lights may be downloaded to the mobile phone 1 from WAP servers. The downloaded sequences may be stored in the memory and assigned to an event as shown above.

According to another preferred embodiment, the mobile phone 1 is provided with signal processor that transforms an audio signal into a control signal for activation of the lights. The audio signal is divided into two or more discrete frequency bands by filters, and the output of the filters is supplied as a signal to the Light driver (L-driver) to activate the lights, with a light with a different color or placement or shape being assigned to each frequency band. The intensity of the lights may be modulated according to the output level from the filter. Thus, the light effects in response to the audio signal become more sophisticated. The signal processor may be programmed to limit the minimum duration of an activation of a light, to avoid a perception by observers of lights that flicker when the transformed audio signal would without this precaution result in a very short activation of the light. Similarly, the maximum duration of an activation of a light may be limited, to avoid continuous, or almost continuous activation of a light.

The source of the audio signal can be selected though the user interface. When source of audio signal is the microphone 6, the mobile phone 1 will function as a light organ in locations where there is music or other rhythmic ambient sound. According to another preferred embodiment, the mobile phone 1 comprises a digital audio player and a radio, which can be selected as the source for the audio signal. Also, the ringing tunes stored in a memory of the mobile phone 1 can be selected as an audio signal supplied to the signal processor. The signal processor may be realized in as hardware or as software. In the latter case, the software could be a downloaded JAVA application run on the mobile phone.

The light organ settings and functions can be modified by the user thought the user interface as explained below.

Figure 2:
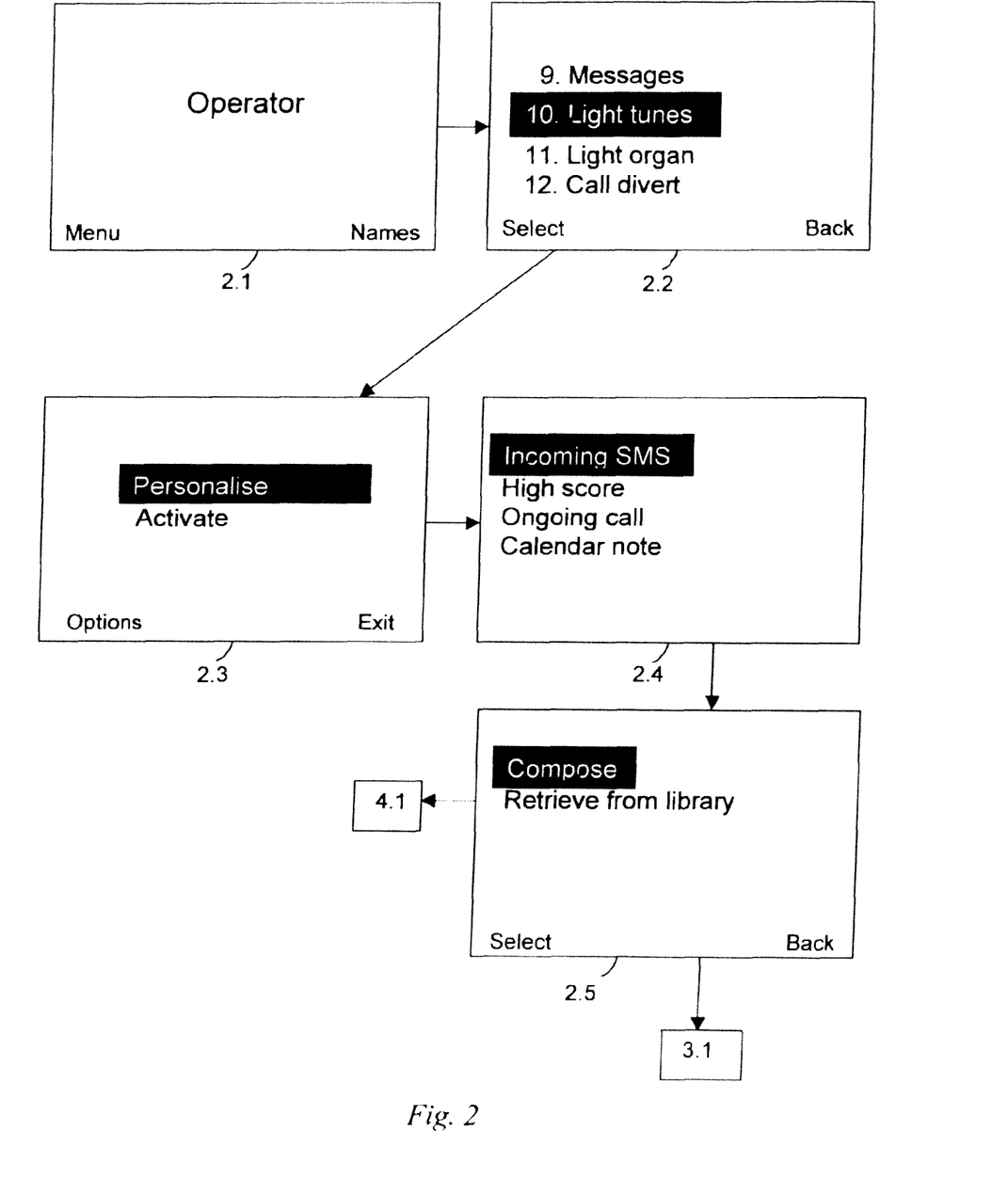
FIGS. 2 to 6 are screen shots illustrating the operation of the user interface in a flow chart manner.
Figure 6:
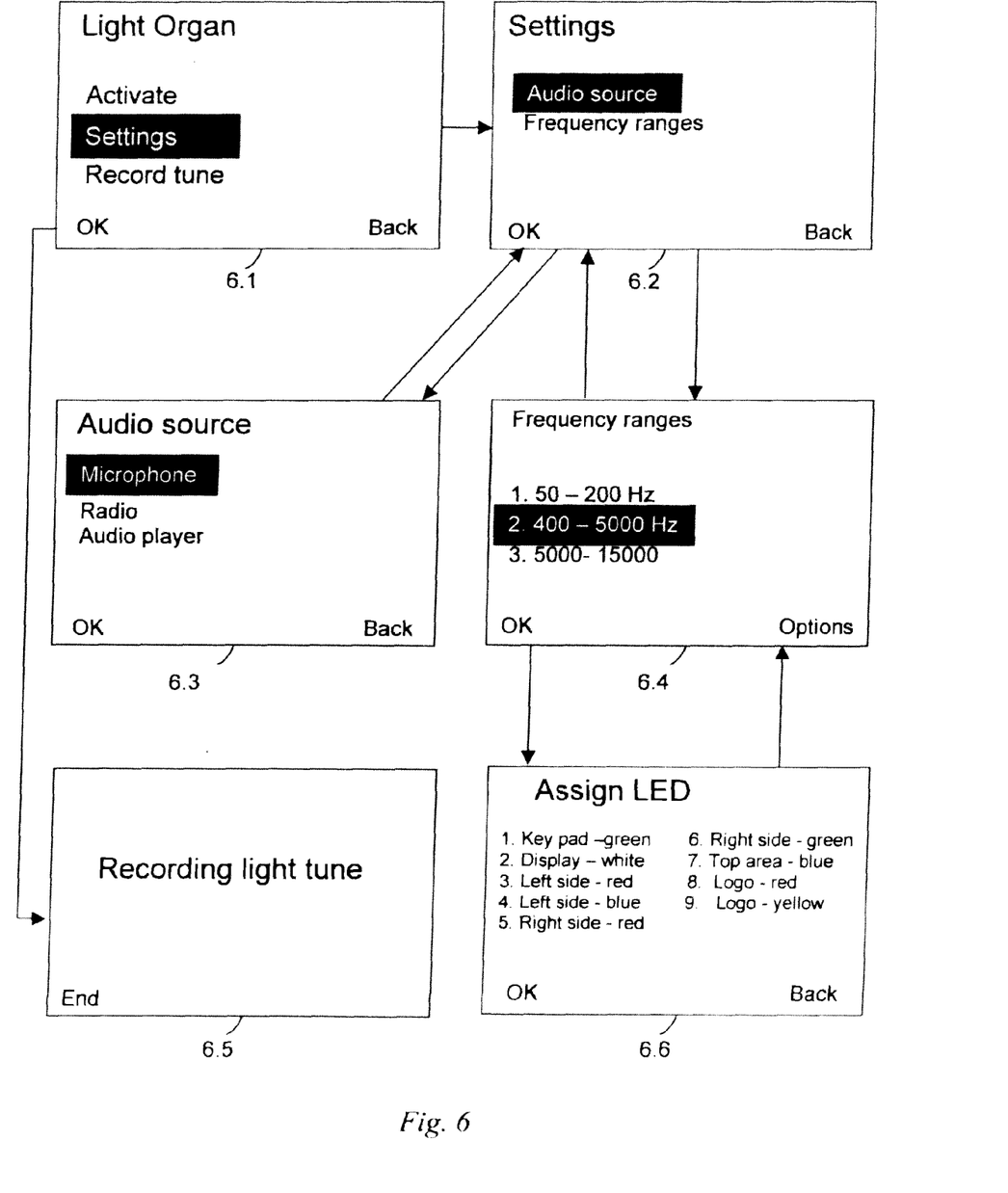

After selecting "Light organ" from the main user interface menu (state 2.2), the user interface turns to state 6.1. The display 3 shows the options "Activate", "Settings" and "Record tune". Using the scroll keys 9,9' and the multi functionality key 8 the user can select "Settings" to arrive at state 6.2. In this state the user is prompted to select the audio source or the frequency ranges. Selecting "Audio source" results in state 6.3, in which either the microphone, the radio or the audio player can be selected as audio source. Selecting "Frequency ranges" in state 6.2 results in state 6.4. In this state the user is prompted to select one of the three frequency ranges where after one of the lights may be assigned to the selected frequency range in state 6.6. Upon pressing the multi functionality key 8' "Options" in state 6.4, a non-shown state allows the user to personalize the frequency bands, and to increase or decrease the number of frequency bands.

Mobile phone 1 comprises a memory and circuitry for recording and storing the activation of the lights in response to the audio signal. Thus, the user does not have to download or enter the sequences of activation of the lights, but may simply record, store and assign them to different events. Preferably, the intensity level during the activation of a light is also recorded. Selecting "Record tune" in state 6.1 starts the recording and results in state 6.5. In state 6.5 the recording can be ended by pressing multi functionality key 8 "End".

Although the invention is shown with preferred embodiments that use two multi functional keys, it is evident that the invention can also be carried out with only one or without any multi-functional functional key. The lights shown in the preferred embodiment are merely an example of lights that may be used to carry out the invention. It is evident that many other lights and light-guiding elements may be used as an alternative. The type of lights, their color shape and location shown in the above exemplary embodiments are not to be interpreted as limiting for the invention.

Any location, shape, color of lights or can used with the present invention. For example the electro luminescent foils may be replaced by any different shaped electro luminescent element such as an electro luminescent wire. Electro luminescent elements are available in a number of basic colors, based on several different dyes. By mixing dyes any color can be obtained, at any place on the mobile phone.

The invention claimed is:

1. A mobile communication terminal comprising a plurality of lights, means for storing a number of sequences of activation of said lights as light tunes, said sequences of activation including information concerning timing of said activations, means for controlling the activation of said lights in accordance with the sequence and the information concerning the timing of the activations for playing the sequence as a light tune, and means for selectively assigning one of said stored sequences of the activation of said lights to a particular event in said mobile communication terminal.

2. A mobile communication terminal according to claim 1, wherein said events can be selected from the group comprising, incoming call, incoming call from a particular caller or caller group, key lock, key unlock, power on/off, calendar alarm, incoming SMS, high score, wake-up alarm, battery status indication and signal strength indication.

3. A mobile communication terminal according to claim 1, wherein said lights comprise LEDs and/or electro luminescent foils and/or electro luminescent strings and/or optical fibers.

4. A mobile communication terminal according to claim 1, wherein at least a part of said plurality of lights is integrated in a removable cover.

5. A mobile communication terminal according to claim 1, wherein said sequences of activation include information concerning the intensity of said activations and wherein said terminal comprises means for activation of said lights in accordance with said intensity information.

6. A mobile communication terminal according to claim 5, wherein said intensity information comprises information concerning an attribute related to the intensity information, and wherein said terminal comprises means for activation of said lights in accordance with said attribute related to the intensity information.

7. A mobile communication terminal according to claim 1, wherein said sequences of activation include information concerning the color of said activations and wherein said terminal comprises means for activation of said lights in accordance with said color information.

8. A mobile communication terminal according to claim 1, further comprising means for playing the stored sequence before assigning the sequence to an event.

* * * * *